(12) United States Patent  (10) Patent No.: US 9,829,054 B1
Rosser  (45) Date of Patent: Nov. 28, 2017

(54) RECIPROCATING ACTION DRIVE

(71) Applicant: Roy Rosser, Monmouth Junction, NJ (US)

(72) Inventor: Roy Rosser, Monmouth Junction, NJ (US)

(*) Notice: Subject to any disclaimer, the term of this patent is extended or adjusted under 35 U.S.C. 154(b) by 0 days.

(21) Appl. No.: 15/607,576

(22) Filed: May 29, 2017

Related U.S. Application Data

(63) Continuation-in-part of application No. 15/444,840, filed on Feb. 28, 2017.

(60) Provisional application No. 62/343,044, filed on May 30, 2016, provisional application No. 62/420,990, filed on Nov. 11, 2016, provisional application No. 62/439,221, filed on Dec. 27, 2016, provisional application No. 62/463,679, filed on Feb. 26, 2017, provisional application No. 62/511,588, filed on May 26, 2017.

(51) Int. Cl.
  *B62M 1/24* (2013.01)
  *F16D 41/24* (2006.01)
  *F16D 67/06* (2006.01)
  *F16D 41/36* (2006.01)

(52) U.S. Cl.
  CPC ............ *F16D 41/24* (2013.01); *F16D 41/36* (2013.01); *F16D 67/06* (2013.01)

(58) Field of Classification Search
  CPC .......... F16D 41/24; F16D 41/36; F16D 67/06; B62M 1/24; B62M 1/26; B62M 1/28; B62M 1/30
  USPC ....... 280/252, 253, 254, 255, 258; 74/89.37, 74/89.13, 89.21; 192/41 R, 41 A
  See application file for complete search history.

(56) References Cited

U.S. PATENT DOCUMENTS

| | | | |
|---|---|---|---|
| 96,208 A | 10/1869 | Dayton | |
| 584,200 A | 6/1897 | Wheatley | |
| 600,450 A * | 3/1898 | Richmond et al. | ... F16H 31/005 74/143 |
| 5,390,773 A * | 2/1995 | Proia | ........................ B62M 1/24 192/41 R |
| 5,884,927 A * | 3/1999 | Mahaney | ................. B62M 1/36 280/237 |

(Continued)

FOREIGN PATENT DOCUMENTS

| | | | |
|---|---|---|---|
| FR | 2726532 | 6/1996 | |
| GB | 2219261 | * 6/1989 | .............. B62M 1/04 |
| WO | WO/2013/052929 | 11/2013 | |

*Primary Examiner* — Anne Marie M Boehler
(74) *Attorney, Agent, or Firm* — r.r (princeton); Roy Rosser

(57) ABSTRACT

A reciprocating action drive is disclosed in which a pair of magnetically sprung over-running clutches, each in overrunning connection with a driven shaft, and attached to a reciprocating lever, are joined via a direction reversing mechanism. In one embodiment, the direction reversing mechanism uses bevel gears, two of which are connected to the outer shells of the overrunning clutches. One or more intermediate bevel gears, mounted orthogonally to the axis of the driven shaft, mesh with the others to form the reversing mechanism. In a further embodiment, the reciprocating action drive is used to power a bicycle using a standard chain ring and chain arrangement and a cadence equalizing 3× epicyclic gear train. In a still further embodiment, sprung limit stops limit the range of motion of the reciprocating levers to 60-degrees, and make stopping at the end of the tread less abrupt.

5 Claims, 3 Drawing Sheets

(56) References Cited

U.S. PATENT DOCUMENTS

| | | | |
|---|---|---|---|
| 7,823,898 B2* | 11/2010 | Hartmann | B62K 5/05 280/253 |
| 8,702,115 B2 | 4/2014 | Kramer et al. | |
| 2009/0261552 A1* | 10/2009 | McIsaac | B62M 1/24 280/255 |
| 2010/0320720 A1* | 12/2010 | Bezerra | B62K 9/02 280/252 |
| 2015/0285318 A1* | 10/2015 | Lin | F16D 27/01 192/45.001 |

* cited by examiner

RECIPROCATING ACTION DRIVE

CROSS-REFERENCE TO RELATED APPLICATIONS

This application claims priority to U.S. Provisional Application Ser. No. 62/343,044 filed May 30, 2016, U.S. Provisional Application Ser. No. 62/420,990 filed Nov. 11, 2016, U.S. Provisional Application Ser. No. 62/439,221 filed Dec. 27, 2016, U.S. Provisional Application Ser. No. 62/463,679 filed Feb. 26, 2017, U.S. patent application Ser. No. 15/444,840 filed Feb. 28, 2017 and U.S. Provisional Application Ser. No. 62/511,588 filed May 26, 2017, the contents of all of which are hereby fully incorporated herein by reference.

BACKGROUND OF THE INVENTION

(1) Field of the Invention

The invention relates to a mechanical device for converting reciprocating motion to uni-directional rotary motion, and more particularly, to the use of a pair of magnetically sprung overrunning clutches and a bevel gear reversing mechanism to form a reciprocating action drive to perform that conversion, and most particularly to applying the resultant reciprocating action drive to propel a bicycle.

(2) Description of the Related Art

The technical problem of converting reciprocating motion to uni-directional rotary motion is inherent in the technical field of engineering mechanical devices.

Early forms of converting reciprocating motion into rotary motion, such as bow lathes, resulted in bi-directional, or oscillating, rotary motion that was satisfactory for tasks such as rudimentary wood turning, but is unsuitable for propelling wheeled vehicles that require uni-directional rotary motion.

The earliest, and still the most widely used, device for converting reciprocating motion to uni-directional rotary motion, is the crank, which appears to have been used in Roman sawmills in Asia Minor as early as the $2^{nd}$ Century AD.

When converting linear, or substantially liner, reciprocating motion into rotary motion, the crank, however, has a significant drawback. If the forces applied to the crank arms are linear, then at top-dead center and bottom dead center, i.e., when the line of the applied force runs directly through the axis of rotation of a driven shaft, none of the linear force applied is converted into useful rotary motion of the driven shaft. The effective transfer of energy from the applied linear force increases slowly as the crank angle away from top dead center increases, and is approximately proportional to the sine of that crank angle, reaching a maximum at 90-degree crank angle, after which it begins to decrease again, also approximately proportional to the sine of the crank angle, until it is once again zero at 180-degree crank angle, or bottom dead center.

Despite this significant draw back, but because of their extreme simplicity, cranks have been, and still are, the most used device for converting linear, or substantially linear, reciprocating motion to uni-directional rotary motion. They have been, and still are, widely applied in, for instance, steam locomotives, gasoline powered automobiles, and human powered vehicles such as bicycles.

When a crank is used in a bicycle, unlike when it used in steam engines, or piston driven automobiles, the cyclist can mitigate some of the shortcomings of a crank by electing to only apply force to the pedals when the crank angle is beneficial. However, this means that the force is now being applied in periodic bursts. Because of this, the peak force needed to achieve a given, average power is twice the peak force that would be needed if the force were applied uniformly. Human physiology exacerbates this shortcoming. Human skeletal muscles, such as the quadriceps and hamstring muscles that provide the bulk of the power in cycling, are typically made up of an equal amount of two different fiber types, so called fast twitch and slow twitch fibers. Fast twitch fibers oscillate at about three times the rate of slow twitch fibers, and so produce about three times the force per fiber. However, they are significantly less energy efficient, burning up about sixteen times the amount of glucose, or blood sugar, as slow twitch fibers. During exercise, muscle fibers are recruited according to Henneman's size principle which states that, under load, muscle fibers are recruited from smallest to largest. In practice, this means that slow-twitch fibers are activated before fast-twitch fibers. A cyclist exercising for an extended period time, will, therefore, attempt to keep the forces applied to the pedals to that which can be supplied by slow twitch muscles alone, which is about a quarter of the maximum force that a genetically average cyclist's muscles can supply. This is borne out by actual human performance. A world class cyclist can generate nearly 3 HP in a short, five-second burst, but can only maintain a work output of about 0.65 HP in a one-hour time trial, i.e., the force they can generate over a long period of time is only about 22% of the maximum force they can generate.

Alternate methods of converting linear, reciprocating motion to uni-directional rotary motion have been proposed. In particular, reciprocating action drives, made from the combination of overrunning clutches and a reversing mechanism, have been described in detail in a number of publications, including, for instance, WIPO PCT publication WO/2013/052929 entitled "Mechanism for Converting Reciprocating Motion into Rotary Motion" published on Nov. 4, 2013.

Such mechanisms have, however, typically suffered from overrunning clutches that have slow pickup as well as energy consuming, inefficient overrunning. These defects are primarily the result of the engaging elements being mechanically sprung. This mechanical springing also tends to make such overrunning clutches fragile, difficult to manufacture and difficult to maintain.

What is required to make an effective reciprocating action drive that is useful for converting reciprocating motion to uni-directional rotary motion, is the combination of a pair of efficient, robust and inexpensive overrunning clutches coupled to each other by a simple, but effective reversing mechanism.

The relevant prior art includes:

U.S. Pat. No. 96,208 issued to C. E. Dayton on Oct. 26, 1869 entitled "Velocipede" that describes a new and improved Velocopide in which "By short oscillations of the bell cranks, will rotary motion be imparted to the rear axle".

U.S. Pat. No. 584,200 issued to J. Wheatley on Jun. 8, 1897 entitled "Bicycle" that describes a sprocket-wheel mounted to rock or oscillate on a stud carried by the bicycle frame, a sprocket-chain engaging said sprocket-wheel, fulcrumed pedal-levers to which the lower ends of the chain are attached, a curved rack on the sprocket-wheel, a shaft mounted to rotate on the bicycle-frame and arranged at right angles to the axis of said sprocket-wheel, bevel-gears loosely mounted on said shaft and meshing with the curved rack, clutch devices between the shaft and gear-wheels, a sprocket-wheel rigidly secured on one end of the said shaft, and a sprocket-chain connecting said sprocket-wheel with a sprocket-wheel on the axle of the rear wheel of the bicycle.

U.S. Pat. No. 8,702,115 issued to Kramer, et al. on Apr. 22, 2014 entitled "Drive mechanism and bicycle drive system" that describes a drive mechanism (that) effects a rotary power output in response to a reciprocating power input resulting from substantially linear forces applied to the drive mechanism, such as those forces applied by a rider on a bicycle. The drive mechanism includes input bevel gears meshed with corresponding output bevel gears coupled to a common power output shaft through clutches that effect a rotary power output at the power output shaft in response to the reciprocating power input from the substantially linear forces. Opposite crank arms are coupled with the input bevel gears such that each crank arm is advanced by an applied substantially linear force, and is retracted upon advancement of the opposite crank arm. In a bicycle, opposite pedals are coupled to corresponding crank arms and are moved through predetermined power strokes in response to substantially linear forces applied by a rider to effect corresponding rotational movements of the input bevel gears and concomitant rotary power output at the power output shaft.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive reciprocating action drive is disclosed.

In a preferred embodiment, the reciprocating action drive may have a pair of magnetically sprung over-running clutches that may each be in overrunning connection with a driven shaft. The magnetically sprung over-running clutches may be joined to each other via a direction reversing mechanism. Two reciprocating levers, one connected to each overrunning clutch, may be arranged to pivot about an axis of rotation of the driven shaft to which the clutches are connected. In this way, when a first of the reciprocating levers is moved in a first direction of rotation, the driven shaft is also moved to rotate in the same, first direction of rotation, while the second reciprocating lever is driven to move in a second, opposite direction of rotation. Then, when the second reciprocating lever is moved in the first direction of rotation, the driven shaft is also moved to rotate in the same, first direction of rotation, while the first reciprocating lever is now moved to rotate in the second, opposite direction of rotation.

The direction reversing mechanism is preferably made up of a number of bevel gears. A first of these may be directly connected to, or form a part of, the first overrunning clutch, while the second bevel gear may be rigidly connected to, or form a part of, the second overrunning clutch. One or more intermediate bevel gears, mounted orthogonally to the first and second bevel gears, may mesh with them both, connecting them together to form a reversing mechanism The reciprocating action drive of the present invention may be used in many situations such as, but not limited to, powering a bicycle or an e-bicycle. In powering a bicycle, the driven shaft may, for instance, be rigidly connected to a chain ring. A chain may then be used to functionally connect the chain ring to a rear wheel of the bicycle.

In a further preferred embodiment of using the invention to propel a bicycle, the driven shaft may be connected to the chain wheel via an epicyclic gear train. In such an arrangement, a planetary gear carrier may be directly connected to the driven shaft. The planetary gear carrier may carry a number of planet gears that mesh between a ring gear that is rigidly connected to the bicycle frame, and a sun gear that may be rigidly connected to a chain ring. With the appropriate choice of gear sizes, the sun gear, and hence the chain ring, may be made to rotate at a greater speed than the driven shaft. This increase in gearing may be useful in that it would enable to use the same cadence of foot motion to maintain the same speed when either treading on a reciprocating action drive powered vehicle, or cycling on a conventional, crank operated bicycle. This may be desirable, as each power stroke of treading motion may only be through 60-degrees, which, without the additional gearing, would only turn the drive wheel through 60-degrees. A downward power stroke on a crank operated bicycle, on the other hand, takes the pedal through 180-degrees, resulting in the driving wheel turning through 180-degrees. A gearing ratio of 3× between the reciprocating action driven shaft and the chain ring would then allow the drive train from the train ring on to be exactly like that on a conventional bicycle, and produce the same match of foot cadence to bicycle speed.

Spacer elements that may be used to connect the ring gear of such a to the bicycle frame may also be arranged so as to be limit stops to limit the range of motion of the reciprocating levers. The limit stops may also incorporate springs, or spring material, to make the stopping at the end of the tread less abrupt.

Therefore, the present invention succeeds in conferring the following, and others not mentioned, desirable and useful benefits and objectives.

It is an object of the present invention to provide an effective reciprocating action drive for converting reciprocating motion to uni-directional rotary motion.

It is another object of the present invention to provide reciprocating action drive that uses and efficient, robust and inexpensive overrunning clutch.

Yet another object of the present invention is to provide an effective reciprocating action drive that is efficient, robust, inexpensive and easy to maintain and may be readily incorporated into a bicycle.

DETAILED DESCRIPTION OF THE INVENTION

Figure 1A:
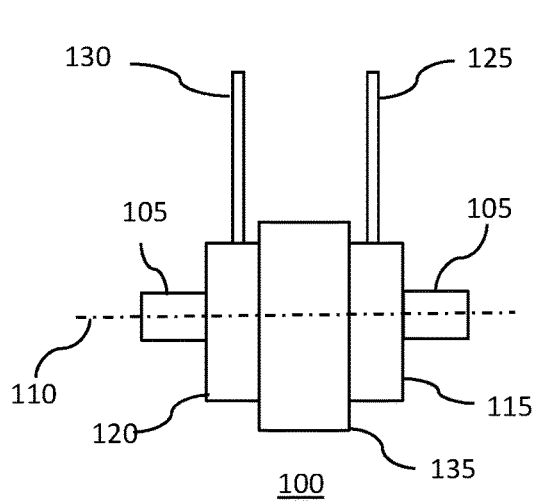
FIG. 1A shows a schematic, top view of a reciprocating action drive of one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1A shows a schematic, top view of a reciprocating action drive of one embodiment of the present invention.

Figure 1B:
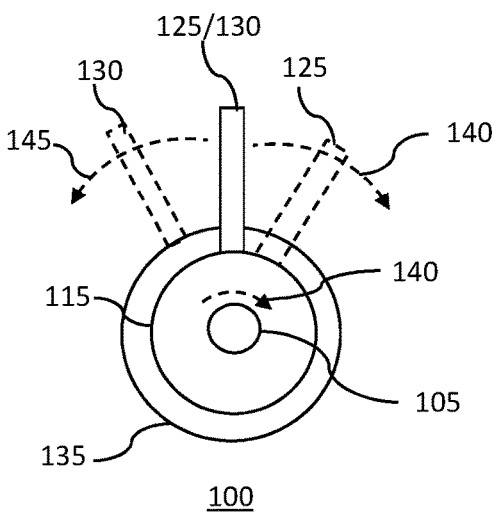
FIG. 1B shows a schematic, side view of a reciprocating action drive of one embodiment of the present invention.

FIG. 1B shows a schematic, side view of a reciprocating action drive of one embodiment of the present invention.

The reciprocating action drive 100 may have a first magnetically sprung over-running clutch 115 and a second magnetically sprung over-running clutch 120 that may both be in overrunning connection to a driven shaft 105. The first magnetically sprung over-running clutch 115 may also be connected to a first reciprocating lever 125, and the second magnetically sprung over-running clutch 120 to a second reciprocating lever 130. The reciprocating levers may be attached so as to effectively pivot about the axis of rotation 110 of the driven shaft 105. The magnetically sprung over-running clutches may be connected to each other via a direction reversing mechanism 135.

In this way, when first reciprocating lever 125 is moved in a first direction of rotation 140, the driven shaft 105 may also be moved in the first direction of rotation 140, while the second reciprocating lever 130 may be moved in a second, opposite direction of rotation 145 by the direction reversing mechanism 135.

Similarly, if the second reciprocating lever 130 is moved in the first direction of rotation 140, the driven shaft 105 may still be moved in the first direction of rotation 140, while the first reciprocating lever 125 may be moved in the second, opposite direction of rotation 145 by the direction reversing mechanism 135.

In this manner, the reciprocating action drive 100 shown in FIGS. 1A and 1B may effectively convert reciprocating motion into uni-directional rotary motion.

Figure 2:
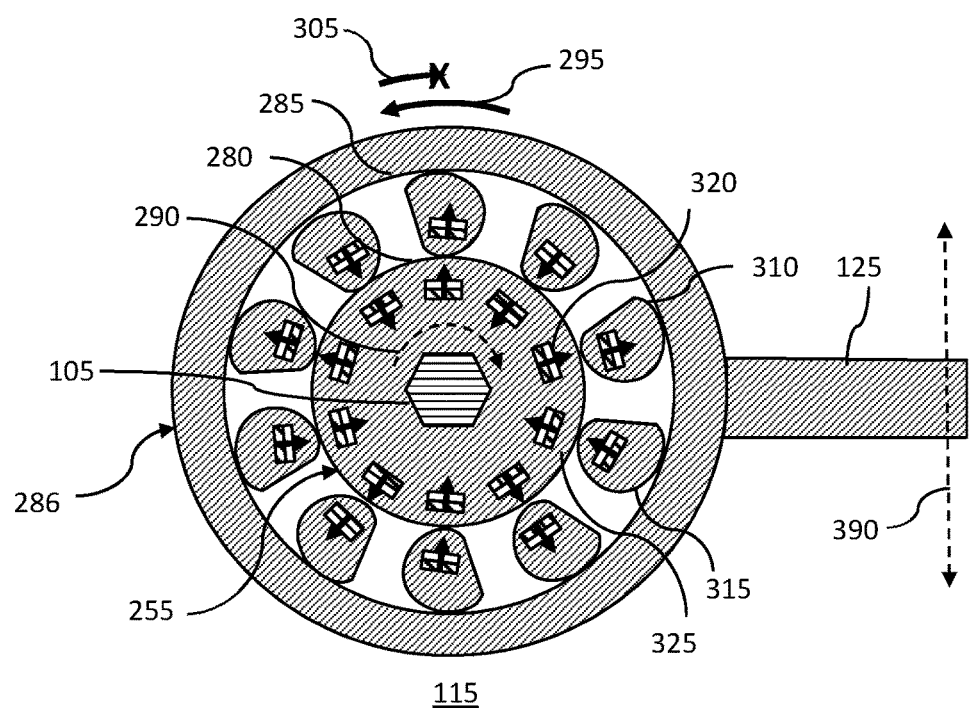
FIG. 2 shows a schematic cross-sectional view of a magnetically sprung over-running clutch as used in one embodiment of the present invention.

FIG. 2 shows a schematic cross-sectional view of a magnetically sprung over-running clutch as used in one embodiment of the present invention.

Magnetically sprung overrunning clutches are described in detail in co-pending patent applications U.S. Provisional Application Ser. No. 62/343,044 filed May 30, 2016, U.S. Provisional Application Ser. No. 62/439,221 filed Dec. 27, 2016, U.S. Provisional Application Ser. No. 62/463,679 filed Feb. 26, 2017 and U.S. patent application Ser. No. 15/444,840 filed Feb. 28, 2017, the contents of all of which are hereby fully incorporated herein by reference.

As shown in FIG. 2, in a preferred embodiment of the present invention, the magnetically sprung over-running clutch 115 may contain a plurality of sprags each incorporating a magnet. Each such sprag may be situated between an inner surface 285 of the overriding clutch's outer contact shell, and an outer surface 280 of the overriding clutch's magnet holding unit. The sprags may be prisms having a cross section that includes one or more sections of a spiral or a pseudo-spiral. The magnets may, for instance, be well-known rare-earth magnets as supplied by, for instance, K&J Magnetics of Pipersville, Pa.

In a preferred embodiment, there may be two types of sprag. The first may be a pseudo-spiral sprag 310 containing a magnet oriented with a north pole facing outward. The second may be a pseudo-spiral sprag 315 containing a magnet oriented with a north pole facing inward. Each of the sprags may be situated opposite a correspondingly oriented magnet. For instance, sprag 310 may be situated opposite magnet 320, that may be constrained in the magnet holding unit to have a north pole facing outward. Similarly, sprag 315 may be situated opposite magnet 325, that may be constrained in the magnet holding unit to have a north pole facing inward.

A surprising, and unexpected, discovery in assembling overrunning clutches of the type illustrated in FIG. 2 was that if all the sprags are of the same magnetic orientation, the resultant, complex magnetic field causes them all to collapse. Only by having sprags of two different magnetic orientations, and by alternating them, was the magnetic springing made effective.

The shape and the springing of the sprags is such that when the overriding clutch outer contact shell 286 is moved in a lockup direction 305 of rotation with respect to the magnetically sprung overriding clutch magnet holding unit 255, the sprags may lockup and torque may be transferred. This torque transfer may, for instance, be from a first reciprocating lever 125, via the overriding clutch's outer contact shell 286 to the magnetically sprung overriding clutch's magnet holding unit 255 via the pseudo-spiral sprags 310 and 315. The magnet holding unit 255 may then transfer the torque to the driven shaft 105, turning it in a direction 290 that may be the same as the lockup direction 305.

Conversely, when the first reciprocating lever 125 is pivoted, or moved by a linear force applied, for instance, along a line of reciprocating force 390 in the overrun direction 295, the pseudo-spiral sprags 310 and 315 pivot in the same direction, and allow the overriding clutch outer contact shell 286 to move freely with respect to the magnetically sprung overriding clutch magnet holding unit 255. This in turn allows the driven shaft 105 to continue to turn in the direction 290.

As shown in FIG. 2, the driven shaft 105 may be a prism with a hexagonal cross-section. By having a correspondingly shaped and sized hexagonal at the center of the overriding clutch's magnet holding unit 255, it may allow for a simple, but effective, connection between them, obviating the need for set-screws or other attachment mechanisms. Other elements that need to freely rotate about the driven shaft 105 may be accommodated by having sleeves that are prims with a hollow, hexagonal center, and circular outer surface. Such a system may also be effective with other regular and irregular polygons.

Figure 3:
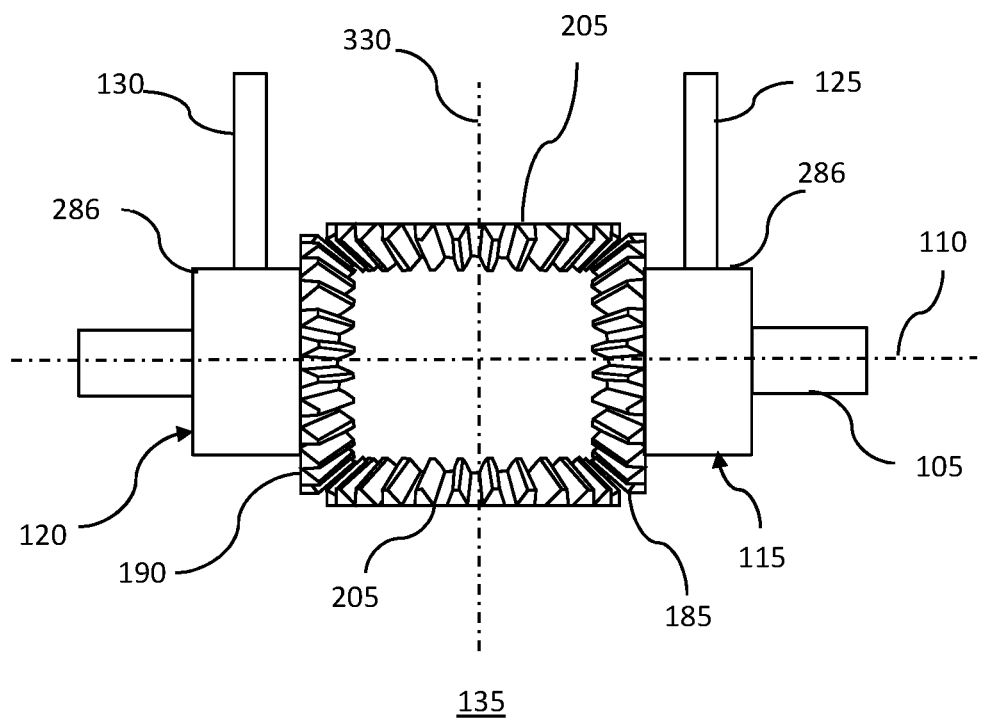
FIG. 3 shows a schematic side view of a direction reversing mechanism of one embodiment of the present invention.

FIG. 3 shows a schematic side view of a direction reversing mechanism of one embodiment of the present invention.

The direction reversing mechanism 135 may have a first bevel gear 185 that may be rigidly, or fixedly, attached to a first magnetically sprung over-running clutch 115, and particularly to the overriding clutch's outer contact shell 286. There may also be a second bevel gear 190 that may be rigidly, or fixedly, attached to the overriding clutch outer contact shell 286 of a second magnetically sprung over-running clutch 120. The first bevel gear 185 and the second bevel gear 190 may both be positioned to rotate about the same axis of rotation 110, but may be oriented so that their geared surfaces are confronting each other. There may then be one or more third bevel gears 205 that may be oriented to rotate about an axis of rotation 330 that may be orthogonal to the axis of rotation 110. These third bevel gears 205 may be sized, shaped and located to meshingly join the first and second bevel gears, 185 and 190.

With such an arrangement, when the first reciprocating lever 125, that may be rigidly, or fixedly, attached to the outer contact shell of the first magnetically sprung over-running clutch 115, moves in a lockup direction, the driven shaft 105 may be driven in the same direction. This action may also cause the second reciprocating lever 130 to be driven to rotate in an opposite direction, that may be the overrunning direction of second magnetically sprung over-running clutch 120. This may be effected by the third bevel gear 205 causing the second bevel gear 190 to rotate in an opposite direction to the first bevel gear 185.

Similarly, when the second reciprocating lever 130 that may be rigidly, or fixedly, attached to the outer contact shell of the second magnetically sprung over-running clutch 120, moves in a lockup direction, the driven shaft 105 may be driven in the same direction, while the first reciprocating lever 125 may be driven to rotate in an opposite direction. This opposite direction may be the overrunning direction of the first reciprocating lever 125. This may happen because the third bevel gear 205 may cause the first bevel gear 185 to rotate in an opposite direction to the second bevel gear 190.

In a preferred embodiment of the direction reversing mechanism 135, the bevel gears may all of the same size and gear shape as this may be beneficial for both the design and the manufacture of the gears, as well as provide effective, meshing coupling of the gears.

In a more preferred embodiment, there may be three of the intermediate gears, i.e., of the third bevel gear 205, which may of the same gear shape and size as the first and second bevel gears. The intermediate gears may be each be mounted about an axis of rotation that is orthogonal to the axis of rotation 110, but which may be oriented at 120-degrees with respect to each other.

Figure 4:
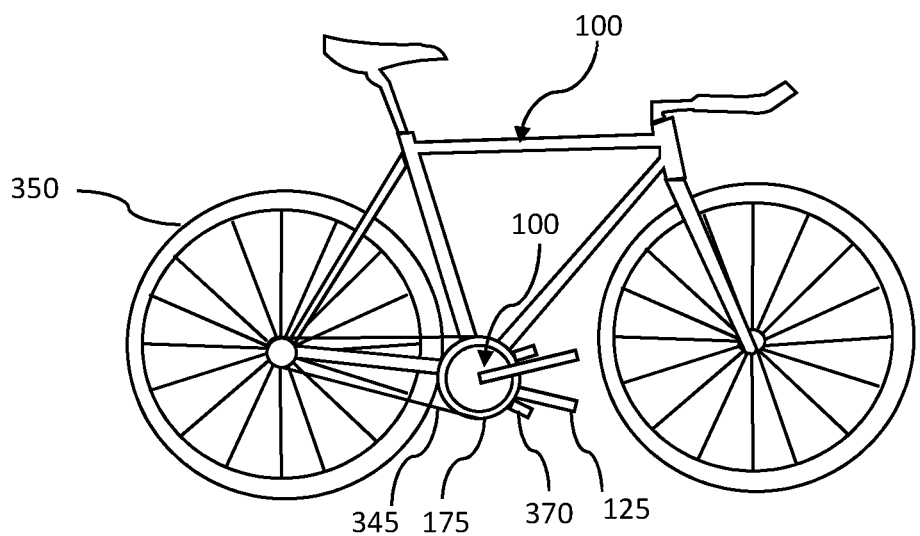
FIG. 4 shows a schematic side view of a bicycle fitted with a reciprocating action drive of one embodiment of the present invention.

FIG. 4 shows a schematic side view of a bicycle fitted with a reciprocating action drive of one embodiment of the present invention.

The bicycle 340 fitted with a reciprocating action drive may, for instance, have the reciprocating action drive 100 located at the bottom bracket location of the bicycle. The reciprocating action drive 100 may have a drive shaft that connects to a chain ring 175 that in turn may be functionally connected to, and used to drive a rear wheel 350 of the bicycle via a chain 345, as is conventional in bicycle design.

The reciprocating action drive 100 may be designed to have parts that are threaded to allow it to be screwed into the bottom bracket of a conventional bicycle, thereby allowing the reciprocating action drive 100 to be retrofitted to any conventional bicycle.

For instance, the common thread for most bicycle's bottom bracket-bearing unit is 1.37 inches in diameter and has 24 threads per inch (TPI). The drive side thread is typically a left-handed thread and the non-drive side, a right handed thread. A reciprocating action drive 100 may have a drive side unit with a left-handed 1.37"×24 TPI, thereby allowing it to be fixed by the tread to the bicycle frame. A non-drive side unit may then have a right handed 1.37"×24 TPI, thereby allowing it to be fixed by the tread to the bicycle frame. The reversing unit may then reside within the bottom bracket shell, or may be located on the non-drive side and mechanically communicate with the drive side via one or more tubular shafts running through the bottom bracket shell. Similarly, with an appropriately sized bottom bracket shell, the magnetically sprung over-running clutches may also reside within the bottom bracket shell.

As shown in FIG. 4, the range of motion of one, or both, of the reciprocating levers 125 may be constrained by one or more limit stops 370. The limit stop 370 may be fixedly connected to the bicycle frame 375 and may incorporate springs, or may be made of spring material. Such limit stops 370 may, for instance, cushion the end of a cyclist's tread, and may limit the range of motion of the levers to a fixed angle, such as, but not limited to, a range of 60-degrees. The range of motion may also, or instead, be adjustable by a user, and may for instance be adjustable, or fixed, within a range from 30-degrees to 120-degrees.

Figure 5:
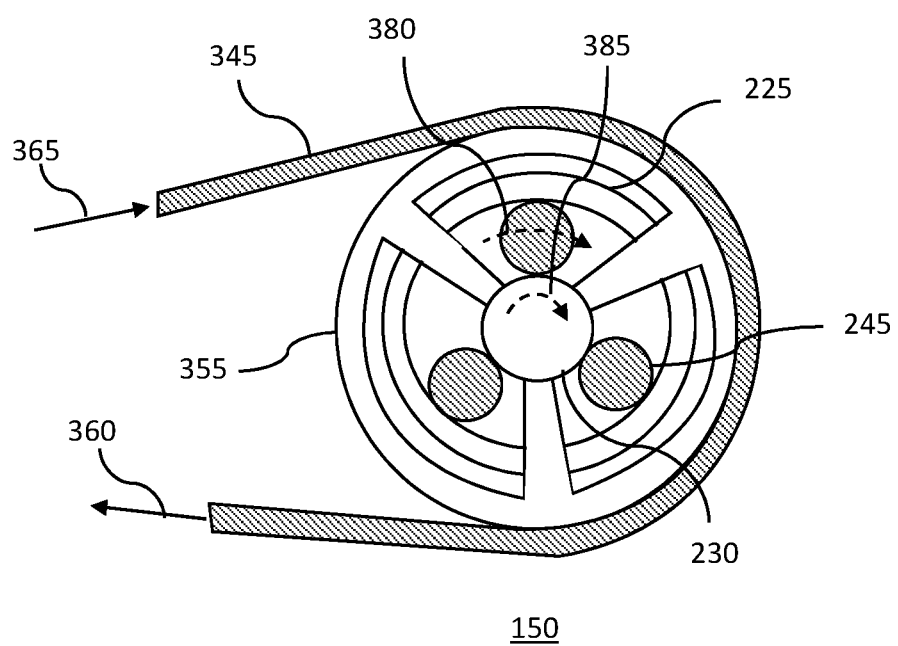
FIG. 5 shows a schematic side view of an epicyclic gear train linked to a chain in one embodiment of the present invention.

FIG. 5 shows a schematic side view of an epicyclic gear train linked to a chain in one embodiment of the present invention. The chain 345 may also form a connection 365 from a rear wheel, and a connection 360 back to a rear wheel.

The epicyclic gear train 150 may, for instance, include a sun gear 230, a ring gear 225 and one or more planetary gears 245 disposed between, and meshed to, the sun and ring gears as in conventional in a planetary gear arrangement. A carrier for the planetary gears 245 may be directly connected to a drive shaft, while the sun gear may be connected to a bicycle chain ring 355 that in turn may be connected to a chain 345. The chain 345 may be in connection 365 and 360 with, and turning, for instance, a shaft that may, for instance, drive the rear wheel of a bicycle.

As shown in FIG. 5, with the ring gear 225 held fixed, a direction of rotation of the planet gear carrier 380 will be the same as a direction of rotation of the sun gear 385.

From well-known equations of gearing, it may be found that, with the ring gear fixed, $$Ws/Wc = 1 + Nr/Ns. \quad (1)$$

where Ws represents the angular velocity of the sun gear, Wc the angular velocity of the planet gear carrier, Nr represents the number of teeth in the ring gear and Ns the number of teeth in the sun gear.

From equation 1, it can be deduced that for the sun gear, which is attached to the ring gear in the arrangement above, to turn at three times the rate of the planet carrier, which is attached to the driven shaft in the arrangement above, the following may apply:

$$3 = 1 + Nr/Ns \quad (2)$$

Or $$Nr = 2Ns \quad (3).$$

If the size of the teeth on all gears is the same, as is conventional in planetary gear design, the diameter of the gears is proportional to the diameter of the gears. With a ring gear twice the diameter of the sun gear, geometry requires that the planet gears be half the size of the sun gear.

A ratio of sun gear:planet gear:ring gear diameters of 2:1:4 will, with the ring gear fixed, make the sun gear rotate at three times the speed of the planet gear carrier. A 3× increase in gearing may be desirable when fitting a reciprocating action drive to a bicycle as, given a treadle angle of 60-degrees, that would mean that for a given bicycle speed, the treadle cadence will be the same as the crank cadence on a conventional bike.

One of ordinary skill in the art will, however, appreciate that equation 1 may be used to calculate any reasonable increase in gearing that may be required, and that users may desire any ratio in, for instance, a range of 2× to 4×.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A reciprocating action drive, comprising:
   a driven shaft having an axis of rotation;
   a first magnetically sprung over-running clutch and a second magnetically sprung over-running clutch, each overrunning clutch being in overrunning connection with said driven shaft;
   a first reciprocating lever, connected to said first overrunning clutch so as to pivot about said axis of rotation of said driven shaft, and a second reciprocating lever, connected to said second overrunning clutch so as to pivot about said axis of rotation of said driven shaft;
   a direction reversing mechanism comprising:
   a first bevel gear connected to said first overrunning clutch;
   a second bevel gear connected to said second overrunning clutch; and
   a third bevel gear meshed to said first and second bevel gears such that a rotary motion of said first bevel gear in a first rotary direction results in a rotary motion of said second bevel gear in a second rotary direction that is opposite to said first rotary direction; and
   wherein said direction reversing mechanism is connected to said first and second overrunning clutches such that moving said first reciprocating lever in a first direction of rotation causes said driven shaft to rotate in said first direction of rotation and said second reciprocating lever to move in a second opposite direction of rotation, and such that moving said second reciprocating lever in said first direction of rotation causes said driven shaft to rotate in said first direction of rotation and said first reciprocating lever to move in said second opposite direction of rotation;
   a planetary gear carrier connected to said driven shaft and carrying a plurality of planetary gears;
   a ring gear connected to a frame of a bicycle;
   a sun gear connected to a chain ring; and
   a chain connecting said chain ring to a rear wheel of said bicycle.

2. The reciprocating crank of claim 1, wherein, said planetary gears, said ring gear and said sun gear form an epicyclic gear train having a gearing ratio of at least 2.5.

3. The reciprocating crank of claim 2, further comprising a set of limit stops that restrict the motion of said first reciprocating lever to within a range of 30 to 120 degrees.

4. The reciprocating crank of claim 3, wherein, said limit stops restrict the motion of said first reciprocating lever to 60 degrees and wherein said gearing ratio is 3.

5. The reciprocating crank of claim 3, wherein, said limit stops comprise a springing element.

* * * * *